United States Patent [19]
Fujita et al.

[11] 3,888,845
[45] June 10, 1975

[54] PROCESS FOR PRODUCING EPSILON-CAPROLACTAM

[75] Inventors: Yutaka Fujita; Tatsuyuki Naruchi; Eishin Yoshisato, all of Iwakuni, Japan

[73] Assignee: Teijin Limited, Osaka, Japan

[22] Filed: Mar. 5, 1971

[21] Appl. No.: 121,550

[30] Foreign Application Priority Data
  Mar. 9, 1970    Japan............................. 45-20008
  Apr. 10, 1970   Japan............................. 45-31012
  Apr. 15, 1970   Japan............................. 45-32074
  Oct. 12, 1970   Japan............................. 45-88773
  Oct. 15, 1970   Japan............................. 45-90060
  Nov. 19, 1970   Japan............................. 45-102166
  Dec. 28, 1970   Japan............................. 45-123958

[52] U.S. Cl....... 260/239.3 A; 252/454; 252/455 R; 252/476; 252/474; 252/467
[51] Int. Cl............................................. C07d 41/06
[58] Field of Search............................. 260/239.3 A

[56] References Cited
UNITED STATES PATENTS

| | | | |
|---|---|---|---|
| 2,817,646 | 12/1957 | Payne | 260/239.3 A |
| 3,317,516 | 5/1967 | Mifune et al. | 260/239.3 A |
| 3,317,517 | 5/1967 | Mifune et al. | 260/239.3 A |

FOREIGN PATENTS OR APPLICATIONS

| | | | |
|---|---|---|---|
| 1,506,874 | 11/1967 | France | 260/239.3 A |

*Primary Examiner*—Henry R. Jiles
*Assistant Examiner*—Robert T. Bond
*Attorney, Agent, or Firm*—Sherman & Shalloway

[57] ABSTRACT

Epsilon-caprolactam is prepared without the formation of by-product ammonium sulfate by contacting at least one of $\epsilon$-caprolactone or a $C_{1-4}$ lower alkyl ester of $\epsilon$-hydroxycaproic acid, hydrogen and ammonia in the vapor phase at 200° to 320°C. with a solid catalyst comprising (A) at least one oxide selected from titanium dioxide, alumina, aluminasilica and silica, and (B) metallic copper. Optionally the catalyst contains metallic nickel and/or chromium sesquioxide.

8 Claims, No Drawings

3,888,845

PROCESS FOR PRODUCING EPSILON-CAPROLACTAM

This invention relates to a process for producing ε-caprolactam, and more particularly to a process for producing ε-caprolactam by contacting ε-caprolactone, hydrogen and ammonia with a catalyst in the vapor phase.

As is well know, ε-caprolactam is commercially produced in large quantities as a material for nylon 6, and is a very important compound. Various methods have previously been proposed for the production of ε-caprolactam. Many of the commercial methods, however, yield large quantities of by-product ammonium sulfate. Formerly, ammonium sulfate was regarded as very valuable for use in chemical fertilizers, but because it renders the soil extremely acidic, it has gradually been superseded by urea or other compounds. Thus, the value of ammonium sulfate as a fertilizer has been greatly reduced, and the disposal of the by-product ammonium sulfate constitutes a great setback. Accordingly, the cost of production cannot be reduced with the methods of producing ε-caprolactam in which ammonium sulfate is produced in great quantities as a by-product. The difficulty of disposing the by-product ammonium sulfate also prevents the construction of large-scale equipment. For these reasons, there is a strong demand for the development of a commercial method which is free from the formation of by-product ammonium sulfate.

Methods free from the formation of by-product ammonium sulfate have in fact been proposed, as is seen from U.S. Pat. No. 3,000,880 which discloses a process for producing ε-caprolactam by heating ε-caprolactone in an aqueous solution of ammonia. These methods, however, require extremely high temperatures and pressures, and are not commercially feasible. Moreover, the products obtained by these methods do not prove satisfactory.

Accordingly, an object of the present invention is to provide a process for producing ε-caprolactam in one step by the vapor phase catalytic reaction of ε-caprolactone or $C_1$–$C_4$ alkyl esters of ε-hydroxycaproic acid, which process does not yield by-product ammonium sulfate.

Another object of the invention is to provide a process for producing ε-caprolactam at high conversions and selectivities by the vapor phase catalytic reaction at relatively low temperatures and pressures using as reactants ε-caprolactone or said ester $C_1$–$C_4$ alkyl esters of ε-hydroxycaproic acid, hydrogen, ammonia, and if desired, water, which reactants are available at very low cost.

Still another object of the invention is to provide a novel catalyst system that can be used in the above vapor phase catalytic reaction.

Other objects and advantages of the invention will become apparent from the following description.

According to the present invention, ε-caprolactam is produced at high conversion and selectivity by contacting ε-caprolactone or at least one $C_1$–$C_4$ alkyl ester of ε-hydroxycaproic acid, hydrogen and ammonia with a solid catalyst comprising (a) at least one oxide selected from the group consisting of titanium dioxide, alumina, alumina-silica and silica and (b) metallic copper, in the vapor phase at 200°C. to 320°C.

The invention will be described below in greater detail.

STARTING MATERIALS

In the present invention, ε-caprolactone or at least one lower alkyl ester having 1 to 4 carbon atoms of ε-hydroxycaproic acid or a mixture of two or more of these esters are used as the starting materials. When the ester is used as the starting material, an alcohol, one of the constituents of the ester, is formed as a by-product of the reaction according to the invention, and an extra step of recovering the alcohol is needed. It is most advantageous therefore to use ε-caprolactone as the starting material.

Preferred esters of ε-hydroxycaproic acid are those having 1 to 4 carbon atoms, such as methyl, ethyl, propyl and butyl esters. With an increasing number of carbon atoms, the esters have a higher boiling point, and make it more difficult to operate the vapor phase reaction of the invention. Sometimes, the operation needs to be carried out at reduced pressure, and both the efficiency of the equipment and the rate of forming the lactam are reduced. Accordingly, the methyl or ethyl ester is especially suitable.

The ε-caprolactone may be produced by any method. For example, it can be prepared in good yields by a method wherein ε-hydroxycaproic acid or its ester is distilled by heating in the presence of boric acid (French Pat. No. 1,474,098), or a method wherein cyclohexanone is oxidized with a peroxide (U.S. Pat. NO. 3,064,008 and British Pat. No. 841,839).

The $C_1$–$C_4$ alkyl esters of ε-hydroxycaproic acid used in the invention can be readily prepared, for example, by esterifying hydroxycaproic acid or ε-caprolactone with lower alcohols having 1 to 4 carbon atoms.

ε-Hydroxycaproic acid can be produced in high yields, for example, by air oxidation of cyclohexane or a mixture of it with cyclohexanone or cyclohexanol in the absence of a solvent (for example, British Pat. No. 935,029 and French Pat. No. 1,275,952).

The present invention has the great advantage that ε-caprolactam can be produced in high yields without the formation of by-product ammonium sulfate by using the ε-caprolactone or $C_1$–$C_4$ alkyl esters of ε-hydroxycaproic acid which are commercially available at relatively low cost.

CATALYST

As previously stated, a solid catalyst basically comprising the following two components:

A. at least one oxide selected from the group consisting of titanium dioxide ($TiO_2$), alumina ($Al_2O_3$), alumina-silica ($Al_2O_3$—$SiO_2$) and silica ($SiO_2$) (to be referred to as component A), and B. metallic copper (to be referred to as component B) is used.

Investigation has revealed that the aforesaid oxide (component A) and metallic copper (component B), when used individually, shown little or no catalytic activity in the reaction for producing ε-caprolactam according to the present invention, but when combined with each other to form the catalyst system of the invention, exhibit very strong catalytic activity. The preferred catalyst system to be used in the invention comprises 100 parts by weight of the oxide (component A) and 0.5 to 200 parts by weight, preferably 5 to 100 parts by weight, more preferably 10 to 70 parts by weight, of metallic copper (component B). If the content of metallic copper is outside the range specified above, the yield of ε-caprolactam as the desired product is reduced unfavorably.

The catalyst to be used in the invention should preferably be a mixture in which the metallic copper comes in intimate contact with particles and/or agglomerated particles of the oxide having an average particle diameter of 5 to 100 microns, preferably 10 to 50 microns, especially one in which the metallic copper is deposited on the surfaces of the particles or agglomerated particles of the oxide. The "average particle diameter" used herein refers to an average diameter calcualted according to the formula to be described on the basis of the sedimentation speed which is measured by the sedimentation method widely used, such as the pipette method, sedimentation pipe method, sedimentation balance method, or centrifugal sedimentation method. It is preferred that at least 50 % by weight, especially at least 80 % by weight of the entire particles and/or agglomerated particles of the oxide should have a particle diameter in the range of 5 to 100 microns, preferably in the range of 10 to 50 microns, and moreover, the "average particle diameter" of the entire particles should be within this range. Generally, those having a narrow size distribution are preferred.

The average particle diameter of the particles and/or agglomerated particles of the oxide as component A is determined by the following Stokes equation.

$$De = \left[\frac{18}{(\rho_p - \rho)_u}\right]^{1/2} \left(\frac{h}{t}\right)^{1/2}$$

wherein

De is an average particle diameter in centimeters, is the viscosity coefficient of a medium in g/cm.sec.,
$\rho p$ is the density of particles in g/cm$^3$
$\rho$ is the density of the medium in g/cm$^3$
$g$ is the acceleration of gravity (980 cm/sec$^2$),
$h$ is the distance over which the particles sediment in centimeters, and
$t$ is the time in seconds needed for sedimentation over the distance h.

The relation between the sedimentation velocity and the particle diameter of anatase-type titanium dioxide (TiO$_2$) (density 3.84) in pure water was determined according to the foregoing equation. The sedimentation velocity $v$ is obtained by coverting h/t to the sedimentation distance (cm/min.) per minute. The results are shown in the following Table.

| Temperature | Particle diameter | | | | | |
|---|---|---|---|---|---|---|
| | 5μ | 10μ | 20μ | 30μ | 40μ | 50μ |
| 0°C | 0.12 | 0.5 | 2.1 | 4.6 | 8.3 | 13.4 |
| 14°C | 0.19 | 0.8 | 3.1 | 7.0 | 12.5 | 20.0 |
| 24°C | 0.25 | 1.0 | 4.1 | 9.2 | 16.3 | 25.4 |
| 30°C | 0.30 | 1.2 | 4.6 | 10.7 | 18.7 | 30.0 |
| 50°C | 0.41 | 1.7 | 6.7 | 15.0 | 26.8 | 41.9 |
| 80°C | 0.65 | 2.6 | 10.3 | 23.1 | 41.1 | 65.7 |
| 100°C | 0.85 | 3.3 | 13.0 | 28.4 | 51.7 | 83.5 |

Thus, the average particle size of titanium dioxide can be readily determined by measuring the precipitating rate of titanium dioxide in pure water. The average particle diameter of other oxides can also be determined by the same simple experiment using the above-mentioned equation.

Titanium dioxide (TiO$_2$) is suitable as the oxide (A), and anatase-type titanium dioxide is especially advantageous. Anatase-type titanium dioxide is preferred also because it can be readily made into particles or agglomerated particles having a narrow size distribution and the preferred particle diameter range as mentioned above. Alumina (Al$_2$O$_3$), alumina-silica (Al$_2$O$_3$—SiO$_2$) or silica (SiO$_2$) used as the oxide (A) may be any of those which are usually employed as catalysts or catalyst supports. The preferred alumina-silica has a weight Al$_2$O$_3$/SiO$_2$ ratio of 1 or more, and ordinary silica gel is used as the silica.

The preparation of the solid catalyst of the present invention consisting basically of the oxide (component A) and metallic copper (component B) is effected, for example, by dispersing the oxide in an aqueous solution of a copper compound or an aqueous suspension of the copper compound, precipitating the copper compound from the solution when the aqueous solution of the copper compound is used, separating a mixture of solid copper compound and the oxide from the aqueous medium, calcining the mixture at a temperature sufficient to convert the copper compound to copper oxide but preferably not to sinter the resulting copper oxide, for example 200° to 800°C., preferably 250° to 600°C. for a proper period of time (calcining step), and thereafter, reducing the mixture until at least the surface of the copper oxide is substantially converted to metallic copper (reducing step).

The reduction of copper oxide is effected by using a suitable reducing agent, preferably hydrogen at 170° to 350°C., preferably 170° to 270°C. The reduction reaction may be continued until the generation of water by the reduction of copper oxide is substantially completed. Since the reaction is generally exothermic, it is desirable to exercise care so that the resulting metallic copper will not be sintered.

A mixture of copper oxide formed by the calcining step and the oxide as component A, if desired, may be fabricated to suitable size prior to the reducing step. Such fabrication is not always necessary since the catalyst of the present invention can be used as a fluidized bed as will be described later.

In the preparation of the catalyst of the present invention, any water-soluble or water-insoluble copper compounds can be used which can be converted to copper oxide in the aforementioned calcining step (step of producing copper oxide). Examples of the water-soluble copper compound include water-soluble or water-insoluble inorganic and organic acid salts of copper, such as inorganic acid salts of copper including, for example, copper nitrate, sulfate, hydrochloride or hydrobromide, and organic acid salts of copper including copper acetate, benzenesulfonate or toluenesulfonate; water-soluble copper complexes such as water-soluble copper ammine complex; and other water-soluble copper complex salts. The deposition or sedimentation on the oxide particles as component A of such water-soluble copper compound by precipitating it from its aqueous solution can be effected by a suitable method such as by heating and concentrating an aqueous solution of the water-soluble copper compound, and/or adding alkali. The aforementioned water-soluble copper compounds may be directly converted to copper oxide in the calcining step, or a copper compound formed by the reaction of the copper compounds with the alkali mentioned above may be convertible to copper oxide in the calcining step. As the alkali to be used for precipitating a copper compound from an aqueous solution of the watersoluble copper compound, various compounds are used such as sodium carbonate, potassium carbonate, sodium hydroxide, potassium hydroxide, aqueous ammonia, ammonium carbonate, sodium bicarbonate, potassium bicarbonate, and ammonium bicarbonate. At the time of adding the alkali, an aqueous solution of the copper compound may be heated properly. When the copper compound is precipitated by adding alkali, it is preferred to remove the wter-soluble salt produced by addition of alkali by a suitable method such as wasing prior to the calcining step.

Those water-insoluble copper compounds mentioned above which can be converted to copper oxide in the calcining step are, for example, copper hydroxide, hydrated copper oxide, copper carbonate, basic copper carbonate, and copper oxalate. When the water-insoluble copper compound is used, it is mixed in a powder form or an aqueous suspension with the oxide (component A), and if desired after separating water, the mixture is calcined and reduced as mentioned above.

As described above, the preparation of the catalyst of the present invention is performed by depositing or sedimenting the copper compound on the surfaces of particles or agglomerated particles of the oxide (component A), calcining them under the proper temperature and time conditions mentioned above to convert the copper compound to copper oxide, and preferably reducing the largest possible area of the copper oxide to convert at least the surface of the copper oxide to metallic copper (component B). It is convenient that the average particle diameter of the oxide (component A) be adjusted to the aforementioned range.

Investigation has revealed that a catalyst of long life and high activity can be obtained by adding small amounts of metallic nickel and/or chromium sesquioxide ($Cr_2O_3$) (to be referred to as component C) to the catalyst of the present invention.

Barium oxide (BaO) and manganese oxide ($MnO_2$) are compounds well known as a sintering inhibition agent for a copper catalyst, but it has been found that the addition of a small amount of barium oxide or manganese oxide to the catalyst composed of the two components A and B give virtially no advantage. Various catalysts have also been prepared by coprecipitating a small amount of cobalt metal (Co), calcium oxide (CaO), zinc oxide (ZnO), magnesium oxide (MgO), aluminum oxide ($Al_2O_3$), or iron oxide ($Fe_3O_4$) and the aforesaid water-soluble copper compound on the oxide particles (component A), and subjecting them to the calcining and reducing steps, with studying of their activities, lives, etc. It has been found that these third components have no particular merit. The investigation led to the discovery that all of these third components including the aforementioned barium oxide and manganese oxide, when added in an amount of 0.02 or more in terms of the atomic ratio based on copper (Cu), commonly reduce the activity of the resulting catalyst, and that if the content is less than 0.02, especially less than 0.01, the third component neither gives merit or demerit (the composition of the third component is expressed as the typical chemical composition in the resulting catalyst after the calcining and reducing steps).

However, the aforementioned metallic nickel and/or chromium sesquioxide (component C) apparently behave differently from the third components mentioned. By incorporating small amounts of such component C in the components A and B, a highly active catalyst is obtained having a longer catalyst life than a catalyst obtained from the two components A and B alone.

The amount of metallic nickel and/or chromium sesquioxide (component C) is such that the sum of the amounts of metallic copper (component B) and metallic nickel and/or chromium sesquioxide (component C) is 0.5 to 200 parts by weight, preferably 5 to 100 parts by weight, more preferably 10 to 70 by weight, per 100 parts by weight of at least one oxide (component A) selected from titanium dioxide, alumina, alumina-silica and silica, and that component C is 0.001 to 1 atom, particularly 0.005 to 0.25 atom, calculated as the nickel (Ni) and/or chromium (Cr) per atom of copper.

The preparation of the catalyst of the invention containing the component C is performed by forming a mixed aqueous solution of a water-soluble copper compound and a water soluble nickel compound and/or water-soluble chromium compound, heating and concentrating the mixed aqueous solution or adding an alkali to the mixed aqueous solution to thereby precipitate the nickel compound and/or chromium compound as a waterinsoluble compound together with the copper compound, thereafter separating them together with component A from water, and calcining and reducing these compounds to convert the copper compound to metallic copper and simultaneously convert the nickel compound and/or chromium compound to metallic nickel and/or chromium sesquioxide (component C). Any nickel compounds and/or chromium compounds can be used which can be coverted to metallic nickel and/or chromium sesquioxide by the calcining and reducing steps, and water-insoluble compounds of nickel and/or chromium can also be used.

Of the methods of preparing the catalyst of the invention, the so-called sedimentation method is preferred in which the oxide as component A is suspended in an aqueous solution of a water-soluble copper compound, or an aqueous solution of the copper compound together with a water-soluble nickel compound and/or water-soluble chromium compound, and an alkali is added to precipitate the copper compound or the copper compound and the nickel compound and/or chromium compound.

In the production of ε-caprolactam in accordance with the process of the present invention, the amount of hydrogen used is desirably 5 to 70 moles, preferably 10 to 50 moles per mole of the ε-caprolactone and/or ε-hydroxycaproic acid lower alkyl ester. Amounts below this range cause a decrease in the selectivity to ε-caprolactam, and amounts in excess of this range do not increase the selectivity. The suitable amount of ammonia is 1 to 50 moles, preferably 2 to 25 moles per mole of the ε-caprolactone and/or lower alkyl ester of ε-hydroxycaproic acid. Amounts outside this range result in the reduction in the selectivity of ε-caprolactam.

In addition to the amounts of hydrogen and ammonia specified as against the amount of ε-caprolactone and/or lower alkyl ester of ε-hydroxycaproic acid, the amount of hydrogen, per mole of ammonia, is specified as 0.2 to 30 moles, preferably 0.5 to 15 moles, so that ε-caprolactam can be obtained at the most preferable selectivity. If the ratio of ammonia to hydrogen falls outside this range, the selectivity of ε-caprolactam is decreased.

According to the present invention, ε-caprolactam is produced at a high selectivity by contacting a gaseous mixture of ε-caprolactone and/or lower alkyl ester of ε-hydroxycaproic acid, hydrogen and ammonia of the above-specified amounts with the catalyst obtained in the manner specified above. If water is allowed to be present in the reaction system, the side-reactions are inhibited, and ε-caprolactam can be produced at a high selectivity. Furthermore, in the presence of water, the life of the catalyst is prolonged. The amount of water used for this purpose is 0 to 50 moles, preferably 5 to 30 moles, per mole of ε-caprolactone and/or lower alkyl ester of ε-hydroxycaproic acid. Amounts above 50 moles are not commercially desirable, since the space time yield of ε-caprolactam is decreased.

The reaction temperature in the process of the invention is determined according to such factors as the activity of the catalyst used. The preferred temperature is 200° to 320°C., especially 220° to 310°C. At temperatures below 220°C., particularly below 200°C., the reaction to form ε-caprolactam is not sufficiently performed, and a high degree of reduction in pressure is needed in order to maintain the reaction system vaporous. In addition, the space time yield of ε-caprolactam is reduced. On the other hand, the occurrence of side-reactions is vigorous at temperatures above 310°C., especially above 320°C., and the life of the catalyst becomes short.

The reaction pressure is dependent upon the reaction temperature, but usually ranges from 0.01 to 2 atmospheres, preferably from 0.1 to 1.2 atmospheres.

The space velocity is determined by such factors as the reaction temperature, reaction pressure or life of the catalyst. It is usually in the range of 70 to 3600 liters/hr. liter, preferably 200 to 900 liters/hr. liter. The space velocity is the volume velocity (liter/hr.) of gas calculated per catalyst filled volume (liter) in a normal condition.

Any apparatus can be used in the practice of the process of the present invention which is usually employed in the vapor phase catalytic reaction. The contacting of the reactants with the catalyst may be effected in a fixed bed, fluidized bed or moving bed.

The reaction gaseous mixture discharged from the reaction vessel is cooled and condensed to yield a light yellow liquid matter. This matter contains unreacted substances, intermediates and/or by-products such as ε-caprolactone, ε-hydroxycaproamide, or cyclopentanone, besides ε-caprolactam as principal product, and thereafter, ε-caprolactam is separated and recovered from the condensed liquid.

Where ε-caprolactone is used as the material, a greater part of gas not condensed consists of hydrogen and ammonia. When the lower alkyl ester of ε-hydroxycaproic acid is used, an alcohol corresponding to the ester is contained together with hydrogen and ammonia. If the gas contains the alcohol, the alcohol is separated and hydrogen and ammonia are recycled with or without separation.

In the reaction of the present invention as mentioned above, ε-hydroxycaproamide is formed as a by-product together with ε-caprolactam. This can be converted readily to ε-caprolactone by the below-mentioned method or to ε-caprolactone by other methods.

ε-Hydroxycaproamide is saponified with sodium hydroxide or potassium hydroxide to convert it to the alkali salt of ε-hydroxycaproic acid. The alkali salt is acidified with a strong acid such as sulfuric acid or hydrochloric acid to form free ε-hydroxycaproic acid, which is cyclized by heating to form ε-caprolactone which can be used as the starting material of the present invention. In the heat-cyclization, NaOH, divalent metallic halides, KCN, MgO, ZnO, $CdCO_3$, orthooric acid, metaboric acid, boric anhydride and $B_2O_3$ are preferably used as catalysts (French Pat. Nos. 1411213, 1474903, and 1474098).

On the other hand, ε-hydroxycaproamide can be converted to ε-caprolactam by heating it in water at 300°–475°C. without conversion to ε-caprolactone (U.S. Pat. No. 3,000,879).

Accordingly, ε-hydroxycaproamide formed by the process of the invention can be readily converted to ε-caprolactone or ε-caprolactam, and therefore the formation of it in a small amount does not constitute any particular setback.

The catalytic activity of various solid acids, such as thorium oxide ($ThO_2$), acid clay, kaolin, bentonite, diatomaceous earth, zirconium silicate, and zinc borate, either alone or in combination with metallic copper (component B), in the vapor phase catalytic reaction of ε-caprolactone or a lower alkyl ester of ε-hydroxycaproic acid, hydrogen and ammonia has been studied. In all instances, the selectivity of ε-caprolactam has been found to be less than 50 %, and these solid acids did not exhibit a catalytic performance that is commercially feasible. Zinc oxide or magnesium oxide gave only unsatisfactory results as in the case of these solid acids.

Unexpectedly, the use of the catalyst of the invention which is composed of the components A and B or the components A, B and C described above makes it possible, quite different from the above-mentioned solid acids, to produce ε-caprolactam at very superior conversion and selectivity.

As will be mentioned below, the catalyst of the present invention can be activated by a simple method, and repeatedly used for further reaction. In this respect also, the process of the present invention is very superior to the conventional processes.

REGENERATION OF CATALYST

The catalyst whose activity has been reduced through use for long periods of time in the reaction to form ε-caprolactam can be activated, for example, by (i) steam treatment, or (ii) oxidation-reduction.

The steam treatment (i) is performed by contacting the catalyst with steam at 100°–500°C., preferably 200°–400°C. for 20 minutes to 20 hours. The catalyst so regenerated can be directly used for the reaction, but becomes more effective if hydrogen is passed through it at 170°–350°C. prior to use.

The oxidation-reduction (ii) is performed by contacting the catalyst with molecular oxygen-containing gas at 100°–800°C., preferably 150°–500°C., for 20 minutes to 20 hours, and then contacting it with hydrogen gas at 170°–350°C., preferably 170°–270°C. In this treatment, steam may be allowed to be present in the molecular oxygen-containing gas and/or hydrogen gas. By this method, the catalyst can be regenerated to an extent such that the activity becomes substantially the same as the initial activity.

The activity of the catalyst can be readily restored by these catalyst regenerating methods (i) and (ii), and therefore, the catalyst of the present invention is commercially very superior.

The invention will now be described in greater detail by the following Examples which are not intended in any way to limit the invention.

EXAMPLE 1

Copper nitrate trihydrate (121.6 g) was dissolved in one liter of water, and 160 g of the powders of titanium oxide were suspended in this aqueous solution. With good stirring, an aqueous 10% solution of sodium carbonate was gradually added dropwise to the solution at room temperature for 30 minutes to adjust the pH of the solution to 7.5. Stirring was continued for a further 1 hour, and the solution was allowed to stand overnight. The solution was then filtered, and the filtrate was thoroughly washed with water, and then dried at 90°–100°C. The resulting powders were carefully decomposed by heat in a stainless steel container with good stirring. The composition of the resulting calcined product corresponded to 20 wt. % CuO and 80 wt. % $TiO_2$, and the weight ratio of $Cu/TiO_2$, and the weight ratio of $Cu/TiO_2$ after reduction with hydrogen corresponded to 0.20. This powdery calcined product was kneaded with water, dried, and pulverized. Particles having a size of 9 – 12 mesh were collected.

The reaction apparatus consisted of a preheating pipe having a length of 500 mm and an inner diameter of 24 mm and a reaction pipe having a length of 600 mm. The preheating pipe was placed at the upper portion and the reaction pipe at the lower portion, both inclined at 30° and both ends were connected. The preheating pipe was packed with 180 cc of glass balls having a diameter of 3 mm. At about the center of the preheating pipe an opening was provided through which water was to be added and at a position about ¼ of the entire length from the upper end, an opening for feeding the materials was provided. The reaction pipe was packed, beginning with the connecting portion with the preheating pipe, with 120 cc of glass balls each having a diameter of 3 mm, 80 cc (68 g) of the catalyst prepared above, and 20 cc of glass balls, in the order mentioned. A thermometer was set up about the center of the catalyst layer. A band heater was wound around the preheating pipe and the reaction pipe, and an asbestos band was wound thereon.

Nitrogen gas was introduced from the upper end of the preheating pipe, and after thorough replacement of the inside atmosphere by nitrogen gas, a gaseous mixture of 0.02 – 0.04 liter/min. of hydrogen gas and 0.50 liter/min. of nitrogen gas was passed through the pipe for 5 hours at 170°–250°C., and then 0.20 liter/min. of hydrogen gas was passed there through for 2 hours at 250°C. Thereafter, the temperature of the preheating pipe and that of the reaction pipe were set at 250°C.

Hydrogen gas was introduced at a flow rate of 0.23 liter per minute from the upper end of the preheating pipe, and while introducing ammonia gas at a flow rate of 0.05 liter per minute (calculated as these gases in a normal condition) from the upper end of the reaction pipe, $\epsilon$-caprolactone was added dropwise from the material feed opening at a rate of 0.051 g/min. (0.010 liter/min. calculated as the material in a normal condition). Thus, over a period of 3 hours, 9.2 g of $\epsilon$-caprolactone were added dropwise, and for additional 3 hours at the same temperature, the hydrogen gas, ammonia gas and water were introduced at the same rates. The reaction product collected in a receiver cooled with dry ice-methanol was extracted five times with an equal amount of chloroform. The chloroform solution was concentrated, and quantitatively analyzed by gaschromatography. It was found that 7.1 g of $\epsilon$-caprolactam and 1.07 g of $\epsilon$-caprolactone were obtained.

The residual aqueous phase resulting from the chloroform extraction, on addition of sodium hydroxide, was refluxed for 3 hours, and acidified with hydrochloric acid, followed by continuous extraction with ether for 5 hours. The ether solution was treated with diazomethane to yield a methyl ester, which was then quantitatively analyzed by gaschromatography. It was found that 0.16 g of methyl $\epsilon$-hydroxycaproate was yielded. The aqueous phase remaining after the chloroform extraction contained $\epsilon$-hydroxycaproic acid amide and a small amount of ammonium $\epsilon$-hydroxycaproate. It is assumed that these compounds were formed by the reaction unreacted $\epsilon$-caprolactone in the receiver after termination of the reaction for form $\epsilon$-caprolactam, or during the treatment of the reaction product. They were quantitatively analyzed as methyl $\epsilon$-hydroxycaproate, and in calculation, dealt with as unreacted $\epsilon$-caprolactone.

The space velocity of the foregoing reaction was 368 liters/hr. liter.

(The amounts of the $\epsilon$-hydroxycaproamide and ammonium $\epsilon$-hydroxycaproate increase or decrease according to the time needed until the treatment of the reaction product, the temperature and state of the reaction product, or the method of chloroform extraction, and their proportions with respect to unreacted $\epsilon$-caprolactone differ. The results of the reaction can be precisely compared by treating them as mentioned above, and quantitatively analyzing $\epsilon$-hydroxycaproamide and ammonium $\epsilon$-hydroxycaproate as methyl $\epsilon$-hydroxycaproate, and dealing with it as unreacted $\epsilon$-caprolactone.)

The yield of $\epsilon$-caprolactam was 78%, the conversion of $\epsilon$-caprolactone was 87%, and the selectivity of $\epsilon$-caprolactam was 90%. The yield of $\epsilon$-caprolactam, the conversion of $\epsilon$-caprolactone and the selectivity of $\epsilon$-caprolactam were calculated according to the following equations. (This will apply to all other Examples and Controls.)

$$\text{Yield} = \frac{\text{Moles of } \epsilon\text{-caprolactam yielded}}{\text{Moles of } \epsilon\text{-caprolactone fed}} \times 100$$

$$\text{Conversion} = \frac{\text{Moles of } \epsilon\text{-caprolactone reacted}}{\text{Moles of } \epsilon\text{-caprolactone fed}} \times 100$$

$$\text{Selectivity of } \epsilon\text{-caprolactone} = \frac{\text{Moles of } \epsilon\text{-caprolactone yielded}}{\text{Moles of } \epsilon\text{-caprolactone fed}} \times 100$$

[Moles of ε-caprolactone reacted = moles of ε-caprolactone − moles of ε-caprolactone recovered + moles of methyl ε-hydroxycaproate recovered]

EXAMPLES 2 TO 11 AND CONTROLS 1 AND 2

Examples 2 to 11 show the relation of the weight ratio of copper or copper and nickel to the titanium dioxide, to the results of the reaction.

A catalyst composed of titanium dioxide and copper was prepared in the same manner as in Example 1. A catalyst consisting of titanium dioxide, copper and nickel was prepared in the same way as in Example 1 using a mixed aqueous solution of copper nitrate and nickel nitrate corresponding to the composition of the catalyst instead of the aqueous copper nitrate solution.

In Example 11, the catalyst used was prepared in the same way as set forth in Example 96 to be described by suspending basic copper carbonate and titanium dioxide in water, and filtering the suspension.

Using ε-caprolactone (LON for short in the tables to be given) as a starting material, the process of the invention was performed in the same way as set forth in Example 1.

Controls 1 and 2 show that titanium dioxide or metallic copper alone hardly exhibit a catalytic activity.

The catalyst used in Control 1 was prepared by kneading the powders of titanium dioxide with water, drying the kneaded product, pulverizing the dried product, and collecting particles having a size of 9 to 12 mesh.

The catalyst used in Control 2 was prepared by adding an aqueous solution of sodium carbonate dropwise to an aqueous solution of copper nitrate to precipitate basic copper carbonate, allowing it to stand overnight, washing the precipitate with water, filtering and drying it, calcining the powdery basic copper carbonate with stirring in a stainless steel vessel to form copper oxide, shaping it into tablets, pulverizing them, and collecting particles having a size of 9 to 12 mesh.

In Controls, the procedure of Example 1 was exactly followed using ε-caprolactone as a starting material. The results obtained are in Table 1.

The titanium dioxide used in all of the Examples and Controls was of the anatase type.

liters of an aqueous solution. To the aqueous solution 280 g of a powder of titanium dioxide (anatase type) were added, and the solution was stirred for 20 minutes to form a dispersion. The size distribution of titanium dioxide in an aqueous suspension of titanium dioxide was separately determined by the sedimentation tube method, and found to be such that particles having a size of less than 28μ were 4%, particles having a particle size of 28 to 35μ were 90%, and particles having a size above 35μ were 6%.

An aqueous solution of sodium carbonate having a concentration of 1.0 mol/liter was added dropwise at room temperature for about 30 minutes while stirring the aqueous suspension to adjust the pH of the solution to 9.5. After continued stirring for additional 30 minutes, the solution was allowed to stand overnight. The resulting precipitate was washed with water by decantation, filtered, and dried at 90° to 110°C. The powders obtained were calcined carefully in a stainless steel vessel with good stirring. The calcined product consisted of 70.0% by weight of titanium dioxide, 28.6% by weight of copper oxide, and 1.4% by weight of nickel oxide. The weight ratio of copper and nickel to titanium dioxide after reduction with hydrogen was 0.34:1, and the atomic ratio of nickel to copper was 0.052:1. The powdery calcined product was kneaded with water, dried and pulverized, and particles having a size of 9 to 12 mesh collected.

The catalysts used in Examples 12 to 13 and 14 to 19 were prepared in the same way as set forth in Example 14 using the same titanium dioxide as used in Example 14.

In each of Examples 12 to 19, the catalyst was packed into the same reaction apparatus as used in Example 1, and reduced with hydrogen at 250°C. or below (Examples 12 to 14), 300°C. or below (Examples 15 and 16), and 350°C. or below (Examples 17 to 19), and in the same way as set forth in Example 1, ε-caprolactone was reacted together with hydrogen, ammonia and water. After stopping the addition of ε-caprolactone, hydrogen, ammonia and water were introduced for an additional two hours at the same temperature at the same flow rates. The reaction product collected in a receiver cooled with dry ice methanol Table 1

| Runs | | Composition of catalyst | | Reaction conditions | | | | | Results of reaction | | |
|---|---|---|---|---|---|---|---|---|---|---|---|
| | | Cu+Ni/TiO₂ (wt.ratio) | Ni/Cu (atomic ratio) | Reaction temperature (°C) | Space velocity (l/hr.l) | H₂/LON (molar ratio) | NH₃/LON (molar ratio) | H₂O/LON (molar ratio) | Yield (%) | Conversion (%) | Selectivity (%) |
| Example | 2 | 0.005 | 0.052 | 260 | 368 | 25 | 3 | 20 | 23 | 41 | 56 |
| " | 3 | 0.03 | 0.052 | 260 | 368 | 25 | 3 | 20 | 70 | 95 | 74 |
| " | 4 | 0.14 | 0.001 | 260 | 390 | 23 | 8 | 20 | 75 | 94 | 80 |
| " | 5 | 0.20 | 0 | 260 | 368 | 23 | 5 | 20 | 82 | 93 | 88 |
| " | 6 | 0.341 | 0.052 | 260 | 368 | 23 | 5 | 20 | 85 | 98 | 87 |
| " | 7 | 0.532 | 0 | 260 | 368 | 23 | 5 | 20 | 86 | 98 | 88 |
| " | 8 | 0.794 | 0 | 260 | 368 | 23 | 5 | 20 | 71 | 94 | 81 |
| " | 9 | 0.955 | 0 | 260 | 368 | 20 | 8 | 20 | 64 | 91 | 78 |
| " | 10 | 1.11 | 0 | 260 | 368 | 23 | 5 | 20 | 58 | 81 | 70 |
| " | 11 | 1.27 | 0 | 260 | 368 | 23 | 5 | 20 | 76 | 93 | 81 |
| Control | 1 | TiO₂ alone | 0 | 260 | 368 | 20 | 8 | 20 | 3 | 36 | 8 |
| " | 2 | Cu alone | 0 | 260 | 368 | 20 | 8 | 20 | 0 | 34 | 0 |

EXAMPLES 12 TO 19

These Examples show the relation of the nickel-copper ratio in the catalyst composed of titanium dioxide, copper and nickel, to the results of the reaction.

The catalyst of Example 14 was prepared as follows:

Copper nitrate trihydrate (346 g) and 22 g of nickel nitrate hexahydrate were dissolved in water to form 3 was extracted with chlorform for 3 hours using a continuous extracting apparatus. The chloroform solution was subjected to gas-chromatography, and ε-caprolactam and ε-caprolactone were quantitatively analysed.

The residual aqueous phase resulting from the chloroform extraction, on addition of sodium hydroxide, was refluxed for 3 hours, acidified with hydrochloric acid, and continuously extracted with ether for 5 hours.

The ether solution was converted to a methyl ester by treatment with diazomethane, and then methyl $\epsilon$-hydroxycaproate was quantitatively analyzed by gas-chromatography.

The results are shown in Table 2.

composition as indicated in Table 3 below.

Using the catlyst so obtained, the process of the present invention was performed by using $\epsilon$-caprolactam (LON for short) or methyl $\epsilon$-hydroxycaproate (MHC for short) as a starting material.

Table 2

| Example No. | Catalyst composition | | Reaction condition | | | | | Results of reaction | | |
|---|---|---|---|---|---|---|---|---|---|---|
| | Cu+Ni/TiO$_2$ (wt.ratio) | Ni/Cu (atomic ratio) | Reaction temp. (°C) | Space velocity (1/hr.l) | H$_2$/LON (molar ratio) | NH$_3$/LON (molar ratio) | H$_2$O/LON (molar ratio) | Yield (%) | Conversion (%) | Selectivity (%) |
| 12 | 0.34 | 0.001 | 260 | 368 | 23 | 5 | 20 | 84 | 95 | 88 |
| 13 | 0.34 | 0.010 | 260 | 368 | 23 | 5 | 20 | 85 | 97 | 88 |
| 14 | 0.34 | 0.052 | 260 | 368 | 23 | 5 | 20 | 84 | 96 | 87 |
| 15 | 0.34 | 0.20 | 260 | 368 | 18 | 10 | 20 | 69 | 97 | 71 |
| 16 | 0.34 | 0.2 | 260 | 368 | 20 | 8 | 20 | 71 | 98 | 73 |
| 17 | 0.33 | 1.0 | 260 | 368 | 23 | 5 | 20 | 51 | 97 | 53 |
| 18 | 0.33 | 1.0 | 260 | 368 | 20 | 8 | 20 | 55 | 96 | 57 |
| 19 | 0.33 | 1.0 | 260 | 368 | 18 | 10 | 20 | 56 | 96 | 58 |

Table 3

| Example No. | Starting Material | Catalyst composition | | Reaction conditions | | | | | Results of reaction | | |
|---|---|---|---|---|---|---|---|---|---|---|---|
| | | Cu+Cr$_2$O$_3$/TiO$_2$ (wt. ratio) | Cr/Cu (atomic ratio) | Reaction temperature (°C) | Space velocity (1/hr.l) | H$_2$/LON (molar ratio) | NH$_3$/LON (molar ratio) | H$_2$O/LON (molar ratio) | Yield (%) | Conversion (%) | Selectivity (%) |
| 20 | LON | 0.34 | 0.01 | 260 | 368 | 20 | 8 | 20 | 86 | 98 | 89 |
| 21 | MHC | 0.34 | " | 260 | 368 | 20 | 8 | 20 | 82 | 97 | 85 |
| 22 | LON | 0.35 | 0.05 | 260 | 368 | 20 | 8 | 20 | 85 | 98 | 87 |
| 23 | MHC | 0.35 | " | 260 | 368 | 20 | 8 | 20 | 83 | 97 | 86 |
| 24 | LON | 0.35 | 0.10 | 260 | 368 | 20 | 8 | 20 | 86 | 99 | 87 |
| 25 | MHC | 0.35 | " | 260 | 368 | 20 | 8 | 20 | 83 | 99 | 84 |
| 26 | LON | 0.35 | 0.20 | 260 | 368 | 20 | 8 | 20 | 85 | 98 | 86 |
| 27 | MHC | 0.35 | " | 260 | 368 | 20 | 8 | 20 | 82 | 98 | 84 |
| 28 | LON | 0.37 | 0.50 | 260 | 368 | 20 | 8 | 20 | 78 | 96 | 81 |

EXAMPLES 20 TO 28

These Examples show the relation of the chromium oxide to copper ratio in the catalyst composed of titanium dioxide, copper and chromium oxide, to the results of the reaction.

The catalyst used in Example 24 was prepared as follows:

Copper nitrate trihydrate (235.0 g) and 43.2 g of chromium nitrate nonahydrate were dissolved in water to form 2.5 liters of an aqueous solution. Two hundred grams of titanium dioxide powder were added to the aqueous solution, and the solution stirred for 30 minutes.

With stirring of the aqueous suspension, an aqueous solution of sodium carbonate having a concentration of 1.0 mol/liter was added dropwise at room temperature over 30 minutes to adjust the pH of the solution to 9.5. After continued stirring for an additional 30 minutes, the solution was allowed to stand overnight. The resulting precipitate was washed with water, filtered, and then dried at 90° to 110°C. The powder was calcined with good stirring in a stainless steel vessel. The calcined product had a composition of 70.1 wt % titanium dioxide, 27.0 wt. % copper oxide, and 2.9 wt. % chromium oxide. After reduction with hydrogen, the weight ratio of copper and chromium oxide to titanium dioxide was 0.35:1, and the atomic ratio of chromium to copper was 0.1:1.

The powdery calcined product was kneaded with water, dried, and pulverized, and particles having a size of 9 to 12 mesh were collected.

The catalyst used in Examples 20 to 23 and 25 to 28 was prepared in the same manner as in the preparation of the catalyst used in Example 24 but had a different

EXAMPLES 29 TO 36

These Examples show the results of the process of the invention carried out using silica gel, alumina-silica or alumina, a catalyst composed of copper and nickel, or a catalyst composed of copper and chromium oxide.

The catalyst used in Example 29 was prepared as follows:

Copper nitrate trihydrate (121.6 g) was dissolved in one liter of water, and 160 g of active alumina which was sufficiently finely divided by means of a ball mill with the removal of finer and coarser particles. With good stirring, an aqueous 10 wt. % solution of sodium carbonate was added dropwise gradually over 30 minutes at room temperature to adjust the pH of the solution to 7.5.

After continued stirring for an additional one hour, the solution was allowed to stand overnight. The solution was then filtered, and the filtrate was thoroughly washed with water, and dried at 90° to 110°C. With good stirring in a stainless steel vessel, the powder obtained was carefully calcined. The calcined product had a composition of 20 wt. % CuO and 80 wt. % Al$_2$O$_3$, and the weight ratio of Cu/Al$_2$O$_3$ after reduction with hydrogen corresponded to 0.20:1.

As a caking agent for the shaping of catalyst, 47.5 g of acid clay (the ratio of acid clay/catalyst being 0.25 by weight) were added to 190 g of the powdery calcined product, and the mixture was well stirred and then kneaded with water. The kneaded mixture was dried, and pulverized. Particles having a size of 9 to 12 mesh were collected.

The catalyst containing nickel or chromium oxide was prepared in the same manner as in the preparation of the catalyst used in Example 24 by using a mixed Table 5

| Controls | Solid acids | Cu/solid acid weight ratio | Reaction temp. (°C) | Yield (%) | Conversion (%) | Selectivities (%) |
|---|---|---|---|---|---|---|
| 3 | thorium oxide | 0.34 | 260 | 7 | 78 | 9 |
| 4 | acid clay | 0.34 | 260 | 35 | 79 | 44 |
| 5 | kaolin | 0.34 | 260 | 13 | 71 | 18 |
| 6 | bentonite | 0.34 | 260 | 18 | 64 | 27 |
| 7 | zinc borate | 0.20 | 250 | 17 | 87 | 30 |
| 8 | zirconium silicate | 0.20 | 250 | 22 | 70 | 20 | aqueous solution of copper nitrate and nickel nitrate or chromium nitrate instead of the aqueous solution of copper nitrate.

The process of the invention was performed in the same way as set forth in Example 1 using ε-caprolactone (LON for short) or methyl ε-hydroxycaproate (MHC for short). The results obtained are given in Table 4.

zinc borate and zirconium silicate were heat-treated for 3 hours at 500° – 550°C. before the preparation of the catalysts.

EXAMPLES 37 TO 47

Titanium dioxide powder was suspended in a mixed

Table 4

| Ex. No. | Starting material | Catalyst composition (A) | (B) | (C) | B+C/A (wt. ratio) | C/B (atomic ratio) | Caking agent/catalyst (wt. ratio) | Reaction temp. (°C) | Space velocity (l/hr.l) | H₂/Starting material (molar ratio) | NH₃/Starting material (molar ratio) | H₂O/Starting material (molar ratio) | Yield (%) | Conversion (%) | Selectivity (%) |
|---|---|---|---|---|---|---|---|---|---|---|---|---|---|---|---|
| 29 | LON | Alumina | Cu | — | 0.20 | 0 | 0.25 | 250 | 360 | 23 | 4 | 20 | 67 | 84 | 80 |
| 30 | LON | " | Cu | Ni | 0.34 | 0.05 | 0 | 260 | 368 | 20 | 8 | 20 | 80 | 98 | 82 |
| 31 | MHC | " | Cu | Ni | 0.34 | 0.05 | 0 | 260 | 368 | 20 | 8 | 20 | 76 | 97 | 78 |
| 32 | LON | Silica alumina | Cu | — | 0.18 | 0 | 0.25 | 250 | 368 | 23 | 5 | 20 | 73 | 87 | 84 |
| 33 | MHC | " | Cu | Cr₂O₃ | 0.34 | 0.05 | 0 | 260 | 368 | 20 | 8 | 20 | 74 | 96 | 77 |
| 34 | LON | " | Cu | — | 0.34 | 0 | 0 | 260 | 368 | 20 | 8 | 20 | 67 | 99 | 68 |
| 35 | LON | " | Cu | Ni | 0.34 | 0.05 | 0 | 260 | 368 | 20 | 8 | 20 | 80 | 98 | 82 |
| 36 | LON | Silica gel | Cu | — | 0.17 | 0 | 0 | 250 | 360 | 23 | 4 | 20 | 64 | 85 | 75 |

1. Silica alumina in Examples 32, 33 and 35 was 10 wt. % SiO₂ and 90 wt. % Al₂O₃.
2. Silica-alumina used in Example 34 was 50 wt. % SiO₂ and 50 wt. % Al₂O₃.
3. In Example 29, acid clay was used, and in Example 32, diatomaceous earth was used as a caking agent.

CONTROLS 3 TO 8

These Controls show the results of experiments using several catalysts composed of a solid acid and copper. The process of the present invention was performed in the same way as set forth in Example 1 using ε-caprolactone as a starting material and a catalyst prepared by using the powders of each of the following solid acids instead of titanium dioxide. The space velocity was 368 liters/hr. liter. The molar ratios of hydrogen, ammonia, and water, based on ε-caprolactone, were 20:1, 8:1 and 20:1, respectively. The results obtained are given in Table 5 below.

aqueous solution of copper nitrate and a metal nitrate indicated in Table 6, and an aqueous alkali solution was added in the same way as set forth in Example 1 to yield a catalyst. The process of the invention was performed using the catalyst so prepared and ε-caprolactone as a starting material. The space velocity was 368 liters/hr. liter. The molar ratios of hydrogen ammonia and water, based on ε-caprolactone, were 20:1, 8:1 and 20:1 respectively. The results obtained are shown in Table 6.

Table 6

The reaction time is the time from the initiation of the reaction

| Example No. | Metal oxide added | Cu/TiO₂ wt ratio | Third metal/cu atomic ratio | Reaction temp. (°C) | Reaction time (hr.) | Yield (%) | Conversion (%) | Selectivity (%) |
|---|---|---|---|---|---|---|---|---|
| 37 | MnO₂ | 0.33 | 0.053 | 260 | 9 – 12 | 66 | 85 | 46 |
| 38 | MnO₂ | 0.34 | 0.010 | 260 | 0 – 3 | 70 | 89 | 78 |
|  | " |  | " | 260 | 6 – 9 |  | 82 | 66 |
| 39 | BaO | 0.33 | 0.053 | 250 | 0 – 3 | 54 | 50 | 51 |
| 40 | BaO | 0.34 | 0.01 | 260 | 0 – 3 | 74 | 93 | 80 |
|  | " |  | " | 260 | 30 – 36 | 55 | 75 | 73 |
| 41 | Co | 0.33 | 0.053 | 250 | 0 – 3 | 64 | 85 | 63 |
| 42 | Co | 0.34 | 0.01 | 260 | 0 – 3 | 74 | 94 | 79 |
| 43 | Fe₃O₄ | 0.34 | 0.053 | 250 | 0 – 3 | 34 | 85 | 40 |
| 44 | ZnO | 0.34 | 0.053 | 250 | 0 – 3 | 54 | 91 | 59 |
| 45 | MgO | 0.34 | 0.053 | 250 | 0 – 3 | 31 | 72 | 43 |
| 46 | Al₂O₃ | 0.34 | 0.053 | 260 | 0 – 3 | 46 | 74 | 62 |
| 47 | CaO | 0.34 | 0.053 | 260 | 0 – 3 | 52 | 85 | 61 |

EXAMPLES 48 TO 54

These Examples show the results of experiments performed by using various starting materials.

A catalyst composed of titanium dioxide and copper and a catalyst composed of titanium dioxide, copper and nickel were prepared in the same way as set forth in Example 1 or Example 14 respectively. Using various ε-hydroxycaproic acid esters as starting materials, the process of the present invention was performed in the same way as set forth in Example 1. The results obtained are shown in Table 7.

EXAMPLES 61 TO 66 AND CONTROLS 13 TO 14

These Examples show the relation of the molar ratios of hydrogen and ammonia to the starting material and the molar ratio of hydrogen to ammonia, with the results of the reaction.

A catalyst was prepared in the same way as in Example 14, in which the weight ratio of copper and nickel to titanium dioxide was 0.34:1 and the atomic ratio of nickel to copper was 0.052:1. The process of the invention was performed using the catalyst and ε-caprolactone (LON for short) as a starting material, while the Table 7

| Example No. | Starting material | Catalyst composition Cu+Ni/TiO (wt. ratio) | Ni/Cu (atomic ratio) | Reaction temp. (°C) | Space velocity (l/hr.l) | $H_2$/Starting material (molar ratio) | $NH_3$/Starting material (molar ratio) | $H_2O$/Starting material (molar ratio) | Yield (%) | Conversion (%) | Selectivity (%) |
|---|---|---|---|---|---|---|---|---|---|---|---|
| 48 | MHC | 0.34 | 0 | 250 | 368 | 20 | 8 | 20 | 71 | 86 | 82 |
| 49 | EHC | " | " | 250 | 368 | " | " | " | 67 | 88 | 76 |
| 50 | IPHC | " | " | 260 | 368 | " | " | " | 64 | 88 | 73 |
| 51 | NBHC | " | " | 270 | 368 | " | " | " | 61 | 91 | 67 |
| 52 | MHC | 0.34 | 0.052 | 260 | 368 | " | " | " | 78 | 94 | 83 |
| 53 | EHC | " | " | 260 | 368 | " | " | " | 73 | 93 | 79 |
| 54 | NBHC | " | " | 280 | 368 | " | " | " | 64 | 97 | 67 |

MHC: (Methyl ε-hydroxycaproate)
EHC: (Ethyl      "          )
IPHC: (iso propyl "         )
NBHC: (n-butyl    "         )

EXAMPLES 55 TO 60 AND CONTROLS 9 TO 12

These Examples were carried out at temperatures in the range of 180° to 360°C.

Using a catalyst composed of titanium dioxide, copper and nickel prepared in the same way as in Example 14 in which the weight ratio of copper and nickel to the titanium dioxide was 0.34:1 and the atomic ratio of nickel to copper was 0.052:1 the process of the invention was performed using ε-caprolactone as a starting material. The molar ratios of hydrogen ammonia and water, based on ε-caprolactone, were 20:1, 8:1 and 20:1 respectively. The results obtained are given in Table 8.

molar ratios of hydrogen and ammonia to ε-caprolactone were varied in several ways. The reaction temperature was 260°C., and the space velocity was 368 liters/hr.liter. The results obtained are given in Table 9.

Table 9

| Example Nos. | $H_2$/LON (molar ratio) | $NH_3$/LON (molar ratio) | $H_2/NH_3$ (molar ratio) | $H_2O$/LON (molar ratio) | Yield (%) | Conversion (%) | Selectivity (%) |
|---|---|---|---|---|---|---|---|
| Example 61 | 26 | 2 | 13 | 20 | 76 | 97 | 78 |
| " 62 | 23 | 5 | 4.6 | 20 | 84 | 98 | 86 |
| " 63 | 20 | 8 | 2.5 | 20 | 85 | 98 | 87 |
| " 64 | 15 | 13 | 1.2 | 20 | 81 | 96 | 84 |
| " 65 | 10 | 18 | 0.56 | 20 | 67 | 90 | 75 |
| " 66 | 5 | 23 | 0.22 | 20 | 41 | 75 | 55 |
| Control 13 | 2 | 26 | 0.08 | 20 | 15 | 57 | 27 |
| " 14 | 0 | 28 | 0 | 20 | 0.5 | 46 | 1 |

Controls 13 and 14 were performed for comparative purposes. Control 14 shows that in the absence of hydrogen, ε-caprolactam cannot substantially be formed.

EXAMPLES 67 TO 76

These Examples show the results of performing the reaction of the invention with varying molar ratios of water to the starting material.

The process of the invention was performed in the

Table 8

| Examples or Controls Nos. | Reaction conditions Reaction temperature (°C) | Space velocity (l/hr.l) | Yield (%) | Results of reaction Conversion (%) | Selectivity (%) |
|---|---|---|---|---|---|
| Control 9 | 180 | 368 | 11 | 41 | 27 |
| Example 55 | 200 | " | 33 | 57 | 58 |
| " 56 | 230 | " | 79 | 88 | 90 |
| " 57 | 250 | " | 84 | 93 | 89 |
| " 58 | 260 | " | 85 | 97 | 87 |
| " 59 | 280 | " | 67 | 99 | 68 |
| " 60 | 300 | " | 43 | 99 | 44 |
| Control 10 | 330 | " | 8 | 100 | 8 |
| " 11 | 330 | 735 | 32 | 99 | 32 |
| " 12 | 360 | 735 | 5 | 100 | 5 | same way as set forth in Example 1 using ε-caprolactone (LON for short) or methyl ε-hydroxycaproate (MHC for short) as the starting material and the catalyst prepared in the same manner as in Example 14 or 24. The results are shown in Table 10.

To determine the effect of water, the space velocities in Examples 67 to 69 and those of Examples 70 to 75 were made equal respectively using nitrogen gas instead of water.

by using ε-caprolactone (LON for short) as the starting material and a catalyst prepared in the same way as set forth in Example 14 or 1 from titanium dioxide and copper, or from titanium dioxide, copper and nickel. The results are given in Table 12.

The space time yield of ε-caprolactam is the number of moles of ε-caprolactam yielded for 1 hour per liter of the catalyst.

Titanium dioxide used in Examples 83 to 85 con-

Table 10

| Ex. No. | Starting Material | Catalyst composition | | | Reaction condition | | | | | | Result of reaction | | |
|---|---|---|---|---|---|---|---|---|---|---|---|---|---|
| | | Cu+Ni+ Cr$_2$O$_3$/ TiO$_2$ (wt. ratio) | Ni/Cu (atomic ratio) | Cr/Cu (atomic ratio) | Reaction temp. (°C) | Space velocity (l/hr.l) | H$_2$/ Starting material (molar ratio) | NH$_3$/ Starting material (molar ratio) | H$_2$O/ Starting material (molar ratio) | N$_2$/ Starting material (molar ratio) | Yield (%) | Conversion (%) | Selectivity (%) |
| 67 | LON | 0.20 | 0.05 | 0 | 260 | 391 | 23 | 8 | 20 | 0 | 83 | 97 | 85 |
| 68 | " | " | " | 0 | " | 391 | 23 | 8 | 10 | 10 | 77 | 98 | 79 |
| 69 | " | " | " | 0 | " | 391 | 23 | 8 | 0 | 20 | 63 | 99 | 64 |
| 70 | MHC | 0.34 | 0 | 0.05 | 260 | 368 | 20 | 8 | 20 | 0 | 82 | 96 | 85 |
| 71 | " | " | " | " | " | " | 20 | 8 | 0 | 20 | 63 | 91 | 69 |
| 72 | LON | 0.34 | 0.052 | 0 | 260 | 368 | 20 | 8 | 0 | 20 | 65 | 99 | 66 |
| 73 | " | " | " | " | " | 368 | 20 | 8 | 10 | 10 | 79 | 99 | 80 |
| 74 | " | " | " | " | " | 368 | 20 | 8 | 15 | 5 | 83 | 98 | 85 |
| 75 | " | " | " | " | " | 368 | 20 | 8 | 20 | 0 | 85 | 98 | 87 |
| 76 | " | " | " | " | " | 235 | 20 | 8 | 30 | 0 | 78 | 90 | 87 |

EXAMPLES 77 TO 82

These Examples show the results of the reaction performed at varying space velocities.

The process of the invention was performed using ε-caprolactone as the starting material and a catalyst prepared in the same way as set forth in Example 14 in which the weight ratio of copper and nickel to titanium dioxide was 0.34:1 and the atomic ratio of nickel to copper was 0.052:1. The molar ratios of hydrogen, ammonia and water to ε-caprolactone were 20:1, 8:1 and 20:1 respectively. The reaction temperature was 260°C. The results obtained are shown in Table 11.

In Examples 77 to 78, 45 cc of the catalyst were used, and 120 cc of the catalyst were used in Examples 79 to 82.

sisted of 4% by weight of particles having a size less than 28μ, 90% by weight of particles having a size of 28 to 35μ, and 6% by weight of particles having a size of more than 35μ. This particle size distribution was determined by the sedimentation method at 24°C. using a Kelly tube and a suspension of 37 g of titanium dioxide per liter of an aqueous solution of copper nitrate having a concentration of 0.2 mol/liter, and using the Stokes equation.

Titanium dioxide used in Examples 86 to 88 contained 90% by weight of particles having a size of 0.1 to 1μ. The particle size distribution was determined as follows: The sedimentation method was employed at 24°C. using a Kelly tube and a suspension containing 37 g of titanium dioxide per liter of an aqueous solution of Table 11

| Examples Nos. | Results of Reaction | | |
|---|---|---|---|
| | Space velocity (liter/hr.liter) | Yield (%) | Conversion (%) | Selectivity (%) |
| 77 | 1330 | 34 | 50 | 69 |
| 78 | 655 | 66 | 79 | 83 |
| 79 | 368 | 85 | 97 | 87 |
| 80 | 245 | 79 | 98 | 81 |
| 81 | 183 | 77 | 98 | 78 |
| 82 | 122 | 72 | 100 | 72 |

EXAMPLES 83 TO 88

These Examples illustrate the comparison of the activities of catalysts prepared by using titanium dioxides of different particle size distributions.

The process of the present invention was performed copper nitrate having a concentration of 0.2 mol/liter. After a lapse of 1 hour, titanium dioxide particles which did not at all sediment were separated. The particle size of such titanium dioxide particles was measured by the centrifugal sedimentation method at a concentration of titanium dioxide of 2% by weight in water.

Table 12

| Ex. No. | Size distribution of titanium dioxide used | Catalyst composition | | Reaction condition | | | | | Results of reaction | | | |
|---|---|---|---|---|---|---|---|---|---|---|---|---|
| | | Cu+Ni/ TiO$_2$ (wt. ratio) | Ni/Cu (atomic ratio) | Reaction temp. (°C) | Space velocity (l/hr.l) | H$_2$/LON (molar ratio) | NH$_3$/LON (molar ratio) | H$_2$O/LON (molar ratio) | Yield (%) | Conversion (%) | Selectivity (%) | Space time yield of ε-caprolactam (mol/l.hr) |
| 83 | less than 28μ 4 wt% 28–35μ 90 wt% more than 35μ 6 wt% | 0.34 | 0 | 250 | 382 | 22 | 8 | 20 | 88 | 99 | 89 | 0.30 |

Table 12 —Continued

| Ex. No. | Size distribution of titanium dioxide used | Catalyst composition Cu+Ni/TiO₂ (wt. ratio) | Ni/Cu (atomic ratio) | Reaction temp. (°C) | Space velocity (l/hr.l) | H₂/LON (molar ratio) | NH₃/LON (molar ratio) | H₂O/LON (molar ratio) | Yield (%) | Conversion (%) | Selectivity (%) | Space time yield of ε-caprolactam (mol/l.hr) |
|---|---|---|---|---|---|---|---|---|---|---|---|---|
| 84 | " | " | " | 270 | 500 | 22 | 8 | 20 | 84 | 98 | 86 | 0.35 |
| 85 | " | 0.20 | 0.05 | 260 | 368 | 20 | 8 | 20 | 83 | 97 | 85 | 0.28 |
| 86 | 0.1 – 1.0μ  90 wt% | 0.34 | 0 | 260 | 382 | 22 | 8 | 20 | 56 | 65 | 86 | 0.19 |
| 87 | " | " | " | 270 | 382 | 22 | 8 | 20 | 67 | 80 | 84 | 0.22 |
| 88 | " | 0.20 | " | 250 | 382 | 22 | 8 | 20 | 52 | 61 | 85 | 0.17 |

It is seen from the comparison of Examples 83 and 86, Examples 84 and 87, and Examples 85 and 88 that the use of titanium dioxide having a suitable particle size distribution leads to the production of effective catalysts desired in the process of the present invention.

EXAMPLES 89 TO 95

These Examples show the results of performing the process of the present invention using catalysts which consist of titanium dioxide and copper in the same way as in Example 1 except that some other alkali aqueous solutions were used instead of the aqueous solution of sodium carbonate and some copper salts instead of copper nitrate.

The catalyst used in Examples 89 to 93 was prepared by suspending 200 g of powders of titanium dioxide in 3 liters of an aqueous solution containing 260 g (1.08 moles) of copper nitrate trihydrate, and adding an alkali aqueous solution dropwise to the suspension at 40° to 45°C. with stirring, followed by the same treatments as set forth in Example 1.

In the preparation of the catalyst used in Example 89, a mixed aqueous solution of sodium carbonate and sodium hydroxide (containing 0.5 mol of sodium carbonate and 1.0 mole of sodium hydroxide per liter) was used as the aqueous alkali solution to adjust the pH to 9.

In the preparation of the catalyst used in Example 90, an aqueous solution of sodium hydroxide having a concentration of 2 moles/liter was used as the alkali aqueous solution, to adjust the pH to 9.

In the preparation of the catalyst used in Example 91, 1 liter of an aqueous solution containing 2.2 moles of ammonia was used as the alkali aqueous solution.

In the preparation of the catalyst used in Example 92, 1 liter of an aqueous solution containing 2.2 moles of ammonium carbonate was used as the alkali aqueous solution.

In the preparation of the catalyst used in Example 93, 1 liter of an aqueous solution containing 2.2 moles of ammonium bicarbonate was used.

In the preparation of the catalyst used in Example 94, cupric chloride was used instead of copper nitrate, and in the preparation of the catalyst used in Example 95, cupric acetate was used instead of copper nitrate. In both of these Examples, an aqueous solution of sodium carbonate was used as the alkali aqueous solution.

In the catalysts used in Examples 94 and 95, the weight ratio of copper to titanium dioxide was 0.34:1.

The process of the invention was performed in the same way as mentioned in Example 1 using the catalysts prepared above and ε-caprolactone as the starting material. The results obtained are shown in Table 12(a).

Table 12(a)

| Example No. | Reaction temperature (°C) | Space velocity (l/hr.l) | H₂/LON (molar ratio) | NH₃/LON (molar ratio) | H₂O/LON (molar ratio) | Yield (%) | Conversion (%) | Selectivity (%) |
|---|---|---|---|---|---|---|---|---|
| 89 | 260 | 368 | 23 | 5 | 20 | 83 | 98 | 85 |
| 90 | 260 | 368 | 23 | 5 | 20 | 81 | 97 | 83 |
| 91 | 260 | 368 | 20 | 8 | 20 | 78 | 98 | 79 |
| 92 | 260 | 368 | 20 | 8 | 20 | 79 | 98 | 81 |
| 93 | 260 | 368 | 20 | 8 | 20 | 72 | 95 | 76 |
| 94 | 260 | 368 | 20 | 5 | 20 | 84 | 96 | 77 |
| 95 | 260 | 368 | 20 | 5 | 20 | 73 | 97 | 75 |

EXAMPLES 96 TO 110

These Examples show the results of performing the process of the invention using catalysts prepared by some different methods.

The catalyst used in Examples 96 to 101 was prepared by suspending 250 g of the powders of basic copper carbonate obtained by mixing an aqueous solution of copper nitrate with an equivalent amount of an aqueous solution of sodium carbonate, and 200 g of titanium dioxide powder in 2 liters of water, stirring the suspension for 30 minutes, filtering it, drying the filtrate, calcining it with stirring, kneading the calcined product with water, drying the kneaded mixture, pulverizing it, and collecting particles having a size of 9 to 12 mesh. The weight of copper based on titanium dioxide was about 0.8:1.

The catalyst used in Examples 102 to 104 was prepared by suspending 115 g of copper oxide powder obtained by thermal decomposition of basic copper carbonate powder with good stirring, and 150 g of the of titanium dioxide powder in 1.5 liters of water, stirring the suspension for 30 minutes, filtering the suspension, kneading the filtrate well, drying it, pulverizing it, and collecting particles having a size of 9 to 12 mesh. The weight ratio of copper to titanium dioxide was 0.78:1.

The catalyst used in Examples 105 and 106 was prepared by suspending 200 g of titanium dioxide powder in 2 liters of an aqueous solution of copper nitrate having a concentration of 2 moles/liters, stirring the suspension at 50°C. for 1 hour, allowing it to stand overnight at 50°C., suction filtering it, drying it completely free of water, calcining the resulting powder with good stirring to form a powder consisting of titanium dioxide and copper oxide, kneading the powder with water, drying the kneaded mixture, pulverizing it, and collecting particles having a size of 9 to 12 mesh.

The catalyst used in Examples 107 to 110 was prepared by mixing copper hydroxide obtained from copper nitrate and ammonia water with titanium dioxide in water, filtering the mixture, drying the filtrate, calcining it, and then shaping it.

The process of the invention was performed in the same way as set forth in Example 1 using the catalyst so prepared and $\epsilon$-caprolactone as a starting material. The results are shown in Table 13.

Examples 96 through 101, Examples 102 through 104, Examples 105 and 106, and Examples 107 through 110 were each performed successively using the same catalyst as specified above with respect to each group of Examples.

From the comparison of Example 111 with Example 6 in which the catalyst was wet shaped, it is seen that there is substantially no difference between them.

EXAMPLE 113

This Example shows the activating treatment of the catalyst the activity of which was reduced through use in the practice of the process of the invention for relatively long periods of time.

A catalyst comprising titanium oxide and copper in which the weight ratio of copper to titanium dioxide was 0.34:1 was prepared in the same way as set forth in Example 1. Using the resulting catalyst and $\epsilon$-caprolactone as a starting material, the process of the invention was performed in the same way as set forth in Example 1. The reaction temperature was 260°C., and the space velocity was 368 liters/hr.liter. The molar ratios of hydrogen, ammonia and water to the starting $\epsilon$-caprolactone were respectively 20:1, 8:1 and 20:1. The results obtained are shown in Table 15.

Table 13

| Example | Reaction (hr.) | Reaction temp. (°C) | Space velocity (l/hr.l) | H$_2$/CON ratio) | NH$_3$/LON ratio) | H$_2$O/LON ratio) | Yield (%) | Conversion (%) | Selectivity (%) |
|---|---|---|---|---|---|---|---|---|---|
| 96 | 3 | 260 | 368 | 23 | 5 | 20 | 82 | 99 | 83 |
| 97 | 3 | " | 368 | 20 | 8 | 20 | 74 | 92 | 80 |
| 98 | 3 | " | 374 | 20 | 10 | 20 | 66 | 84 | 78 |
| 99 | 4 | " | 368 | 14 | 14 | 20 | 49 | 75 | 65 |
| 100 | 4 | " | 368 | 18 | 10 | 20 | 27 | 60 | 45 |
| 101 | 5 | " | 368 | 23 | 5 | 20 | 32 | 57 | 56 |
| 102 | 3 | 260 | 368 | 25 | 3 | 20 | 66 | 88 | 75 |
| 103 | 3 | " | " | 23 | 5 | 20 | 57 | 78 | 74 |
| 104 | 3 | " | " | 20 | 8 | 20 | 48 | 67 | 72 |
| 105 | 3 | 260 | 368 | 20 | 8 | 20 | 60 | 92 | 66 |
| 106 | 3 | " | " | 20 | 8 | 20 | 59 | 86 | 68 |
| 107 | 3 | " | " | 20 | 8 | 20 | 80 | 96 | 83 |
| 108 | 3 | " | " | 20 | 8 | 20 | 75 | 90 | 84 |
| 109 | 3 | " | " | 20 | 8 | 20 | 64 | 81 | 79 |
| 110 | 6 | " | " | 20 | 8 | 20 | 61 | 67 | 90 |

EXAMPLES 111 TO 112

These Examples show the results of performing the present invention using a catalyst shaped in tablet form which was prepared in the same way as set forth in Example 1.

A powder consisting of titanium dioxide and copper oxide was prepared in the same way as set forth in Example 1, in which the weight ratio of copper to titanium dioxide was 0.34:1. The powder was formed into tablets having a diameter of 6 mm and a thickness of 1.5 mm, at a pressure of about 800 Kg/cm$^2$.

Using 80 cc (72 g) of the resulting catalyst and $\epsilon$-caprolactone as a starting material, the process of the invention was performed in the same way as set forth in Example 1. The results are shown in Table 14.

Table 15

| Reaction time (hours) | Yield (%) | Results of Reaction Conversion (%) | Selectivity (%) |
|---|---|---|---|
| 0 – 3 | 84 | 97 | 87 |
| 55 – 58 | 67 | 85 | 79 |

The reaction was stopped at the end of the 58-hour period. The catalyst used was then activated as follows:

The temperature of the reaction pipe was lowered to 150°C., and nitrogen gas was introduced from the upper end of the preheating pipe. After thorough replacement of the atmosphere by nitrogen gas, a mixed gas of 0–0.5 liters/min. of air and 1 liter/min. of nitro- Table 14

| Example No. | Temp. (°C.) | Space velocity (l/hr.l) | H$_2$/LON (molar ratio) | NH$_3$/LON (molar ratio) | H$_2$O/LON (molar ratio) | Yield (%) | Conversion (%) | Selectivity (%) |
|---|---|---|---|---|---|---|---|---|
| 111 | 260 | 368 | 23 | 5 | 20 | 84 | 96 | 88 |
| 112 | 270 | 368 | 20 | 8 | 20 | 85 | 99 | 86 | gen gas (both being calculated as gases under normal conditions) was introduced. With occasional control of the flow rate of air, the catalyst was oxidized for 1 hour at 350° – 550°C.

After the oxidizing treatment, nitrogen gas was introduced from the upper end of the preheating pipe to purge the system thoroughly. The catalyst was then reduced with hydrogen under substantially the same conditions as used initially. Using the activated catalyst, the reaction was performed under the same conditions as given above. The product yielded for 3 hours after the passage of 3 hours from the initiation of the reaction was analyzed. The conversion of $\epsilon$-caprolactone was 95 %, the yield of $\epsilon$-caprolactam was 81 %, and the selectivity of $\epsilon$-caprolactam was 85 %. This indicated the regeneration of the catalyst activity.

EXAMPLE 114

This Example shows the activating treatment of a catalyst prepared from basic copper carbonate and titanium dioxide.

The catalyst the activity of which was reduced through use in Examples 96 to 101 was treated for 1 hour and 30 minutes with a gaseous mixture of air and nitrogen gas at 400°–450°C. With the replacement of the inside atmosphere of the reactor by nitrogen gas, the temperature was decreased. The catalyst was reduced with hydrogen at a temperature below 250°C. Using $\epsilon$-caprolactone as a starting material, the process of the invention was performed at 260°C. at a space velocity of 368 liters/hour.liter for a total of 9 hours. The molar ratios of hydrogen, ammonia and water to $\epsilon$-caprolactone were respectively 23:1, 5:1 and 20:1. The following results were obtained.

|  | Yield(%) | Conversion(%) | Selectivity(%) |
|---|---|---|---|
| For the first 0–3 hours: | 75 | 93 | 81 |
| From 3 to 6 hours: | 76 | 91 | 83 |
| From 6 to 9 hours: | 75 | 92 | 82 |

Before the activating of the catalyst, the yield of $\epsilon$-caprolactam was 32 %. It can be seen from the comparison of the results of Example 98 for 6 to 9 hours with those obtained above that the activating treatment gave stability to the catalytic activity.

EXAMPLE 115

Example 115 to 120 show the results of the reaction for a long time be repeating the activation of the catalyst.

The catalyst used in Examples 115 to 120 was prepared as follows:

Using 7 liters of an aqueous solution containing 688 g of copper nitrate trihydrate and 54 g of nickel nitrate hexahydrate, 550 g of titanium dioxide (mostly having a particle diameter in the range of 28 to 35$\mu$ in the aqueous solution), and 1.0 mol/liter of sodium carbonate, powders consisting of titanium dioxide, copper oxide and nickel oxide were prepared in the same way as set forth in Example 1. The powders were kneaded with water, dried, and pulverized, and particles having a particle size of 7 to 12 mesh were collected.

The reactor used consisted of a vertical quartz tube having an inner diameter of 60 mm and a length of 1110 mm. At a position 60 mm from the upper end of the tube an opening for adding of the material, a gas inlet opening, and an inlet opening for introduction of steam through a water evaporating tube were provided, and at the lower end, an outlet opening for the reacted mixed gas was provided. The reacted mixed gas was introduced from a water cooler to a receiver, and passed through a trap with dry ice-methanol. At positions 50 mm from the lower end of the reactor and 450 mm from the lower end of the reactor perforated plates were provided, and ceramic Raschig rings were packed to a height of 50 mm from the perforated plate at the lower part. On top of the rings 500 cc (351 g) of the catalyst were packed, and on the catalyst ceramic Raschig rings were packed so that the distance between the perforated plate at the upper part and the surfaces of the rings was 50 mm.

On the other hand, ceramic Raschig rings were packed into a portion from the upper perforated plate to a point 90 mm from the upper end of the reactor to form a preheating layer. Thermometers were placed at about the center of the preheating layer and the catalyst layer. A band heater was wound around the reactor, and an asbestos band was wound on top of it.

Nitrogen gas was introduced from the gas inlet opening of the reactor to purge the reactor thoroughly, and then a gaseous mixture of 0.05–0.25 liter/min. of hydrogen gas and 3.0 liters/min. of nitrogen gas was introduced. The catalyst was reduced with hydrogen for 7 hours at 150°–250°C. while properly controlling the flow rate of hydrogen gas against a temperature rise due to the generation of heat. Hydrogen gas was further passed at a flow rate of 1.5 liters per minute at 250°C. for 3 hours. The temperatures of the preheating layer and the catalyst layer were respectively set at 270°C. and 260°C.

Hydrogen and ammonia were introduced from the gas inlet opening at a flow rate of 72 liters/hr and 29 liters/hr, respectively, and water was fed to the reactor at a rate of 58 g/hr through the water evaporating tube. $\epsilon$-Caprolactone was passed at a rate of 18.3 g/hr, and a continuous reaction was performed. The results obtained are given in Table 16.

Table 16

| Reaction time (hours) | Yield (%) | Results of reaction Conversion (%) | Selectivity (%) |
|---|---|---|---|
| 6 | 84 | 96 | 87 |
| 24 | 83 | 95 | 88 |
| 36 | 78 | 93 | 84 |
| 48 | 74 | 89 | 83 |

The reaction time in the table refers to the time that elapsed since the initiation of the reaction, and the results of the reaction are those obtained for the past 6 hours from the time indicated. (This will apply to Tables 17 to 21 appearing later in the specification.)

EXAMPLE 116

After the end of the operation in Example 115, the inside of the reactor was replaced with nitrogen gas, and a gaseous mixture of air and nitrogen (90 liters/hr) and steam (110 g/hr. through the water evaporating tube) were passed simultaneously through the reactor. The temperature was raised gradually from 150°C. to 410°C. in 3 hours. The treating temperature was controlled by occasionally adjusting the flow rate of air. After replacement by nitrogen gas, the catalyst was reduced with hydrogen for 10 hours at less than 250°C.

After the activating treatment, the reaction was performed under the same conditions as set forth in Example 115. The results are given in Table 17.

Table 17

| Reaction time (hours) | Yield (%) | Results of the reaction Conversion (%) | Selectivity (%) |
|---|---|---|---|
| 6 | 84 | 97 | 86 |
| 24 | 83 | 97 | 85 |
| 36 | 80 | 95 | 84 |
| 48 | 77 | 92 | 84 |
| 60 | 74 | 89 | 83 |

EXAMPLE 117

After the end of Example 116, water vapor (at a flow rate of 110 g/hr. fed through the water vaporization tube) was passed at 250°C. for 3 hours, and then a gaseous mixture of air and nitrogen gas was passed for 3 hours at less than 300°C. The reduction of the catalyst with hydrogen was performed for 4 hours at less than 250°C. After the activating treatment, the reaction was performed under the same conditions as set forth in Example 115. The results obtained are given in Table 18.

Table 18

| Reaction time (hours) | Yield (%) | Results of the reaction Conversion (%) | Selectivity (%) |
|---|---|---|---|
| 6 | 83 | 98 | 85 |
| 24 | 84 | 97 | 86 |
| 36 | 81 | 95 | 85 |
| 48 | 79 | 94 | 84 |
| 60 | 77 | 93 | 83 |

EXAMPLE 118

After the end of Example 117, the activation of the catalyst was performed in the same way as in Example 17 at 300°–350°C. Using the activated catalyst, the reaction was performed continuously under the same conditions as in Example 115. The results obtained are given in Table 19.

Table 19

| Reaction time (hours) | Yield (%) | Results of the reaction Conversion (%) | Selectivity (%) |
|---|---|---|---|
| 6 | 84 | 98 | 86 |
| 18 | 83 | 97 | 86 |
| 24 | 83 | 98 | 85 |
| 36 | 80 | 96 | 83 |
| 48 | 80 | 95 | 84 |

EXAMPLE 119

After the end of Example 118, the catalyst was activated in the same way as set forth in Example 118. Using the activated catalyst, the reaction was performed under the same conditions as set forth in Example 115. The results are shown in Table 20.

Table 20

| Reaction time (hours) | Yield (%) | Results of the reaction Conversion (%) | Selectivity (%) |
|---|---|---|---|
| 6 | 82 | 97 | 85 |
| 24 | 82 | 98 | 84 |
| 36 | 79 | 95 | 83 |
| 48 | 80 | 95 | 84 |

EXAMPLE 120

After the end of Example 119, the catalyst was withdrawn from the reactor, and washed with about 5 liters of water at 70°–80°C., followed by drying to be free of water. The catalyst was then carefully heated with stirring in a stainless steel vessel. The catalyst so treated was sieved, and particles having a particle size of 7 to 12 mesh were collected. Those particles which passed through a 12-mesh sieve were kneaded with water, and the kneaded mixture was dried and then pulverized. Particles having a particle size of 7 to 12 mesh were collected.

370 cc (295 g) of the catalyst so obtained were reduced with hydrogen in the same way as set forth in Example 115, and with the catalyst so obtained, the reaction was performed at 260°C. using 14 g/hr $\epsilon$-caprolactone, 55 liters/hr hydrogen, 22 liters/hr ammonia and 44 g/hr water. The results obtained are given in Table 21.

Table 21

| Reaction time (hours) | Yield (%) | Results of the reaction Conversion (%) | Selectivity (%) |
|---|---|---|---|
| 6 | 83 | 99 | 84 |
| 24 | 84 | 99 | 85 |
| 36 | 85 | 98 | 87 |
| 48 | 85 | 98 | 87 |
| 60 | 84 | 98 | 86 |
| 72 | 83 | 96 | 87 |
| 84 | 82 | 97 | 85 |
| 96 | 85 | 98 | 87 |
| 108 | 83 | 97 | 86 |
| 120 | 82 | 96 | 85 |
| 132 | 82 | 95 | 86 |
| 144 | 82 | 96 | 85 |
| 156 | 80 | 96 | 84 |
| 168 | 79 | 95 | 83 |
| 180 | 80 | 95 | 84 |

The reaction was performed for a total of 444 hours from Example 115 with the activating of the catalyst carried out 5 times. The results show that the activating treatments did not adversely affect the catalyst, but rather gave a catalyst having a stable catalytic activity for prolonged periods of time.

CONTROL 15

Molded Adkins type copper chromium catalyst (composed of 44–46% CuO, 42–44% $Cr_2O_3$ and 4–5%

$MnO_2$) was pulverized, and particles having 9 to 12 mesh were collected. Using the catalyst so obtained, the reaction was performed for a total of 24 hours at 260°C. and a space velocity of 368 liters/hr.liter. The molar ratios of hydrogen, ammonia and water to $\epsilon$-caprolactone were 20:1, 8:1, and 20:1 respectively. The results obtained are given in Table 22.

Table 22

| Reaction time (hours) | Yield (%) | Results of the reaction Conversion (%) | Selectivity (%) |
|---|---|---|---|
| 0 – 3 | 60 | 88 | 68 |
| 3 – 6 | 58 | 86 | 67 |
| 6 – 12 | 51 | 81 | 63 |
| 12 – 24 | 47 | 72 | 64 |

After the 24-hour reaction, the catalyst was activated in the same way as set forth in Example 115. Using the activated catalyst, the reaction was performed under the same conditions. At the end of 6-hour reaction, the yield of $\epsilon$-caprolactam was 55 %, the conversion of $\epsilon$-caprolactone was 83%, and the selectivity of $\epsilon$-caprolactam was 65.5%. The results show that the Adkins copper chromium catalyst cannot be sufficiently activated.

CONTROLS 16 to 21

These controls show the results of performing the reaction using a catalyst composed of copper and chromium oxide free of titanium dioxide, alumina, alumina-silica or silica gel.

The catalyst used was prepared as follows:

One mole/liter of an aqueous solution of sodium carbonate was added dropwise gradually with stirring to 4 liters of a mixed aqueous solution containing 435 g of copper nitrate trihydrate and 72 g of chromium nitrate nonahydrate, to adjust the pH to 8.5. The solution was allowed to stand for one day, and the precipitate was washed with water, followed by drying at 90°–110°C. The product was carefully decomposed by heat with good stirring in a stainless steel vessel. In the calcined product, the ratio of Cr to Cu was 0.1:1. The powdery calcined product was kneaded with water, and the kneaded mixture was dried, and pulverized. Particles having a particle size of 9 to 12 mesh were collected, and then reduced with a hydrogen-containing gas in the same way as set forth in Example 1. Similarly, catalysts containing copper and chromium oxide in varying proportions were prepared. The reaction was performed using each of the catalysts so prepared. The results obtained are shown in Table 23.

What we claim is:

1. A process for producing $\epsilon$-caprolactam which comprises contacting at least one compound selected from $\epsilon$-caprolactone and $C_1$–$C_4$ lower alkyl esters of $\epsilon$-hydroxycaproic acid with hydrogen and ammonia in the vapor phase at a temperature of 200° to 320°C. with a solid catalyst consisting essentially of
   A. at least one oxide selected from the group consisting of titanium dioxide, alumina, alumina-silica and silica,
   B. metallic copper, and
   C. at least one component selected from the group consisting of metallic nickel and chromium sesquioxide the sum of the amounts of the metallic copper (B), the component (C) being 0 to 200 parts by weight.
2. The process of claim 1, wherein said solid catalyst contains 100 parts by weight of said oxide and 0.5 to 200 parts by weight of metallic copper.
3. The process of claim 1, wherein said solid catalyst comprises particles or agglomerated particles of said oxide having a particle size of 5 to 100 microns, and metallic copper deposited on the surfaces of said particles.
4. A process of claim 1, wherein said solid catalyst comprises anatase type titanium dioxide and metallic copper.
5. The process of claim 1, wherein said solid catalyst is prepared by dispersing said oxide in an aqueous solution of a copper compound or an aqueous suspension calcining the mixture at 200°–600°C., and reducing the mixture until at least the surface of said copper compound is substantially converted to metallic copper.
6. The process of claim 1, wherein said solid catalyst consists of
   A. 100 parts by weight of at least one oxide selected from the group consisting of titanium dioxide, alumina, alumina-silica and silica,
   B. metallic copper, and
   C. a component selected from metallic nickel, chromium sesquioxide and mixtures thereof, the sum of the amounts of the metallic copper (B) and metallic nickel, chromium sesquioxide or mixture thereof (C) being 0.5 to 200 parts by weight, and the atomic ratio of component (C), as nickel, chromium or mixture thereof, to metallic copper (B) being 0.001 to 1:1.
7. The process of claim 1, wherein at least one of $\epsilon$-caprolactone or $C_1$ – $C_4$ alkyl esters of $\epsilon$-hydroxycaproic acid, hydrogen, ammonia are contacted with said solid catalyst in the vapor phase together with water.
8. The process of claim 1, wherein per mole of $\epsilon$-caprolactone or said esters of $\epsilon$-hydroxycaproic acid, Table 23

| Example No. | Cr/Cu (atomic ratio) | Starting material | Reaction temp. (°C) | Space velocity (l/hr.l) | $H_2$/LON (molar ratio) | $NH_3$/LON (molar ratio) | $H_2O$/LON (molar ratio) | Conversion (%) | Selectivity of $\epsilon$-caprolactam (%) | Yield of $\epsilon$-caprolactam (%) |
|---|---|---|---|---|---|---|---|---|---|---|
| 16 | 0.1 | LON | 250 | 368 | 18 | 10 | 20 | 85 | 64 | 55 |
| 17 | 0.1 | LON | 260 | 368 | 20 | 8 | 20 | 91 | 57 | 52 |
| 18 | 0.1 | MHC | 260 | 368 | 20 | 8 | 20 | 92 | 59 | 51 |
| 19 | 0.2 | LON | 250 | 368 | 20 | 8 | 20 | 62 | 58 | 36 |
| 20 | 0.2 | LON | 260 | 368 | 20 | 8 | 20 | 74 | 46 | 34 |
| 21 | 0.5 | LON | 260 | 368 | 20 | 8 | 20 | 71 | 41 | 30 | of the copper compound, precipitating the copper compound when the aqueous solution of copper compound is used, separating a mixture of solid copper compound and the oxide from the aqueous medium, a. 5 to 70 moles of hydrogen,
b. 1 to 50 moles of ammonia, and
c. 0 to 50 moles of water are used.

* * * * *

UNITED STATES PATENT OFFICE
CERTIFICATE OF CORRECTION

Patent No. 3,888,845  Dated June 10, 1975

Inventor(s) FUJITA, ET AL.

It is certified that error appears in the above-identified patent and that said Letters Patent are hereby corrected as shown below:

In the claims, correct Claim 5 as follows:

Claim 5, line 3, after "suspension" insert -- of the copper compound, precipitating the copper compound when the aqueous solution of the copper compound is used, separating a mixture of solid copper compound and the oxide from the aqueous medium, --

Signed and Sealed this thirtieth Day of September 1975

[SEAL]

Attest:

RUTH C. MASON
*Attesting Officer*

C. MARSHALL DANN
*Commissioner of Patents and Trademarks*